United States Patent [19]

Ferraino

[11] 4,285,451
[45] Aug. 25, 1981

[54] METHOD OF AND APPARATUS FOR SEVERING EDGES OF A GLASS SHEET

[75] Inventor: Peter R. Ferraino, Linesville, Pa.

[73] Assignee: PPG Industries, Inc., Pittsburgh, Pa.

[21] Appl. No.: 102,210

[22] Filed: Dec. 10, 1979

[51] Int. Cl.³ .............................................. C03B 33/02
[52] U.S. Cl. ............................................ 225/2; 225/3; 225/96.5
[58] Field of Search ........................... 225/2, 3, 96.5, 4

[56] References Cited

U.S. PATENT DOCUMENTS

| | | | |
|---|---|---|---|
| 3,044,216 | 7/1962 | Billinger | 225/96.5 |
| 3,216,635 | 11/1965 | Lefevre | 225/96.5 |
| 3,259,286 | 7/1966 | LeGras | 225/96.5 X |
| 3,743,148 | 7/1973 | Carlson | 225/2 |
| 3,779,437 | 12/1973 | Yamamoto et al. | 225/3 X |
| 3,998,616 | 12/1976 | Farabaugh | 65/29 |
| 4,033,490 | 7/1977 | Ulivi | 225/96.5 X |
| 4,049,167 | 9/1977 | Guissard | 225/3 X |
| 4,136,807 | 1/1979 | DeTorre | 225/3 X |
| 4,196,830 | 4/1980 | Oravitz, Jr. et al. | 225/2 |

*Primary Examiner*—Frank T. Yost
*Attorney, Agent, or Firm*—Donald Carl Lepiane

[57] ABSTRACT

Bulb edges of a glass sheet severed from a glass ribbon, i.e., lehr ends are removed by imposing a pair of scores in the bulb edge with the score closest to the edge of the lehr end deeper than the other score. The surface of a resilient member lying in a plane subtending an oblique angle with the sheet is moved downward against the bulb edge to sequentially sever the bulb edge at the first and second scores.

9 Claims, 11 Drawing Figures

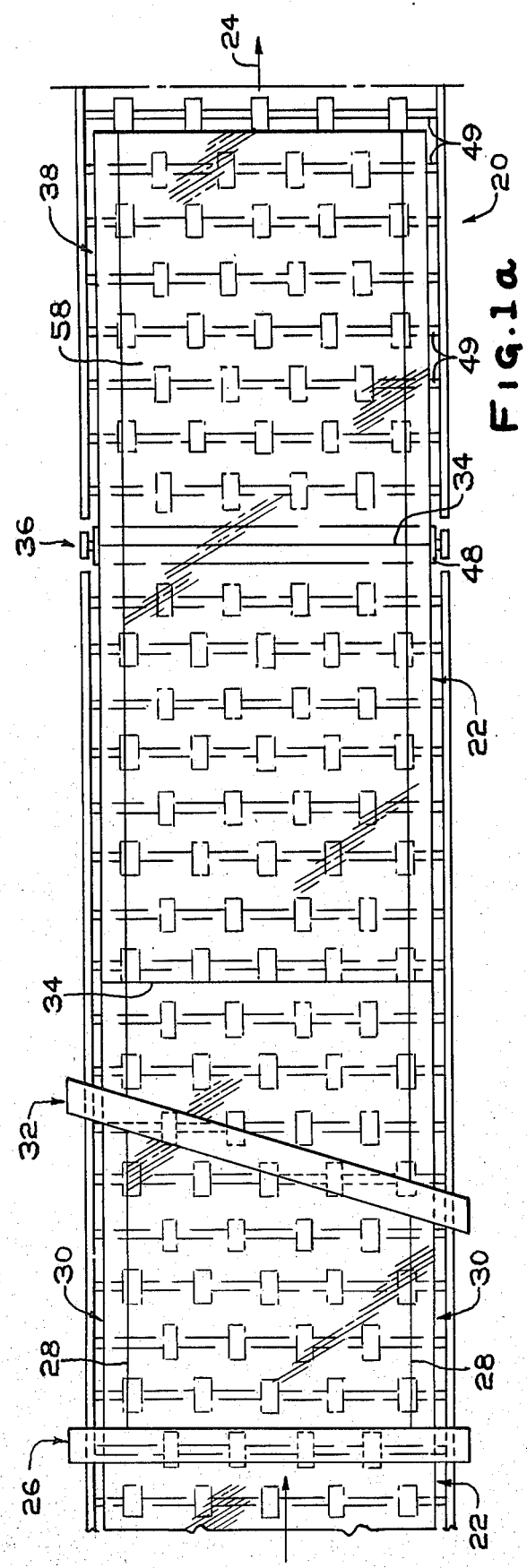
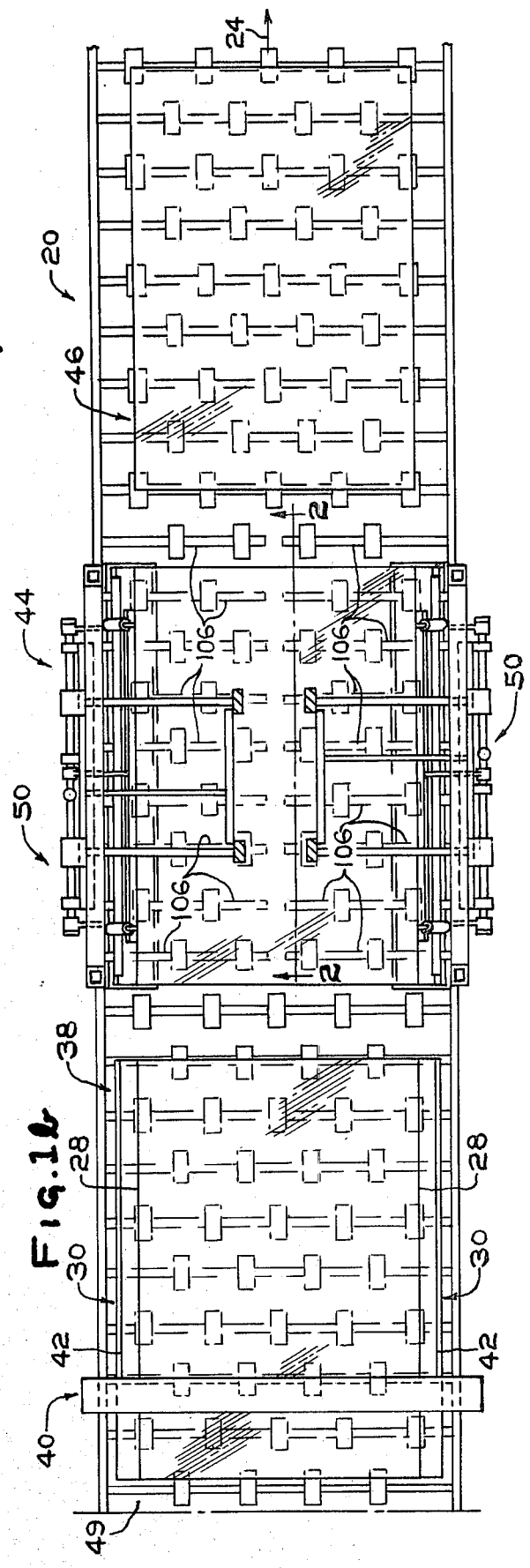

METHOD OF AND APPARATUS FOR SEVERING EDGES OF A GLASS SHEET

BACKGROUND OF THE INVENTION

1. Field of the Invention

This invention relates to a method of and apparatus for severing a sheet of refractory material and, more particularly, to severing bulb edges of a sheet cut from a continuous glass ribbon.

2. Discussion of the Prior Art

As taught in U.S. Pat. No. 3,998,616 in the manufacture of a glass ribbon by the float method, a continuous ribbon of molten glass is controllably cooled as it moves through a forming chamber on a pool of molten metal. The edges of the molten glass as it cools are engaged by attenuating machines to move the edges relative to one another to provide a dimensionally stable glass ribbon having a thickness other than equilibrium thickness. The glass ribbon after sequentially exiting the forming chamber and annealing lehr is cut into sections normally called lehr ends. Because the edges of the lehr ends contacted by the attenuating machines, i.e., bulb edges are not usable they are removed.

In the prior art the bulb edges are removed by advancing the lehr end through a scoring station where a score is imposed adjacent each of the bulb edges and thereafter moving the scored lehr end into a snapping position. In the snapping position a rigid elongated member moves downward to sever each bulb edge from the lehr end. Although the above technique is acceptable for removing bulb edges from a stationary lehr end it would be advantageous to provide additional severing techniques that may be used to remove bulb edges from stationary or moving lehr ends.

SUMMARY OF THE INVENTION

This invention relates to a method of severing a sheet of refractory material, e.g. a glass sheet by imposing at least one score in the sheet followed by urging a member against the sheet on one side of the score, the member having an engaging surface e.g. a resilient engaging surface lying in a plane subtending an oblique angle with the engaged sheet surface.

This invention also relates to a method of severing a sheet of refractory material, e.g. a glass sheet having at least two adjacent scores with a first score having a depth greater than the adjacent second score. The scores are sequentially opened by biasing a first portion of severing facilities against a portion of the sheet on one side of the first score to open the first score followed by biasing an adjacent portion of the severing facilities against a portion of the sheet between the first and second score to sever the glass at the second score.

Further this invention relates to an apparatus for severing a sheet of refractory material, e.g. a glass sheet having at least one score. The apparatus includes severing facilities having an engaging surface and facilities for biasing the severing facilities to move the engaging surface toward the movement path such that the plane containing the engaging surface and the plane of the movement path subtend an oblique angle.

Still further this invention relates to an apparatus for severing a sheet of refractory material, e.g. a glass sheet having two adjacent scores. The apparatus includes scoring facilities having a first engaging surface portion and a second engaging surface portion and facilities for sequentially moving the first and second engaging surface portions through the sheet movement path.

BRIEF DESCRIPTION OF THE DRAWING

FIGS. 1a and 1b are plan views of a conveyor for severing a glass ribbon into lehr ends and removing bulb edges from the lehr ends in accordance to the teachings of the invention;

DESCRIPTION OF THE INVENTION

Figure 2:
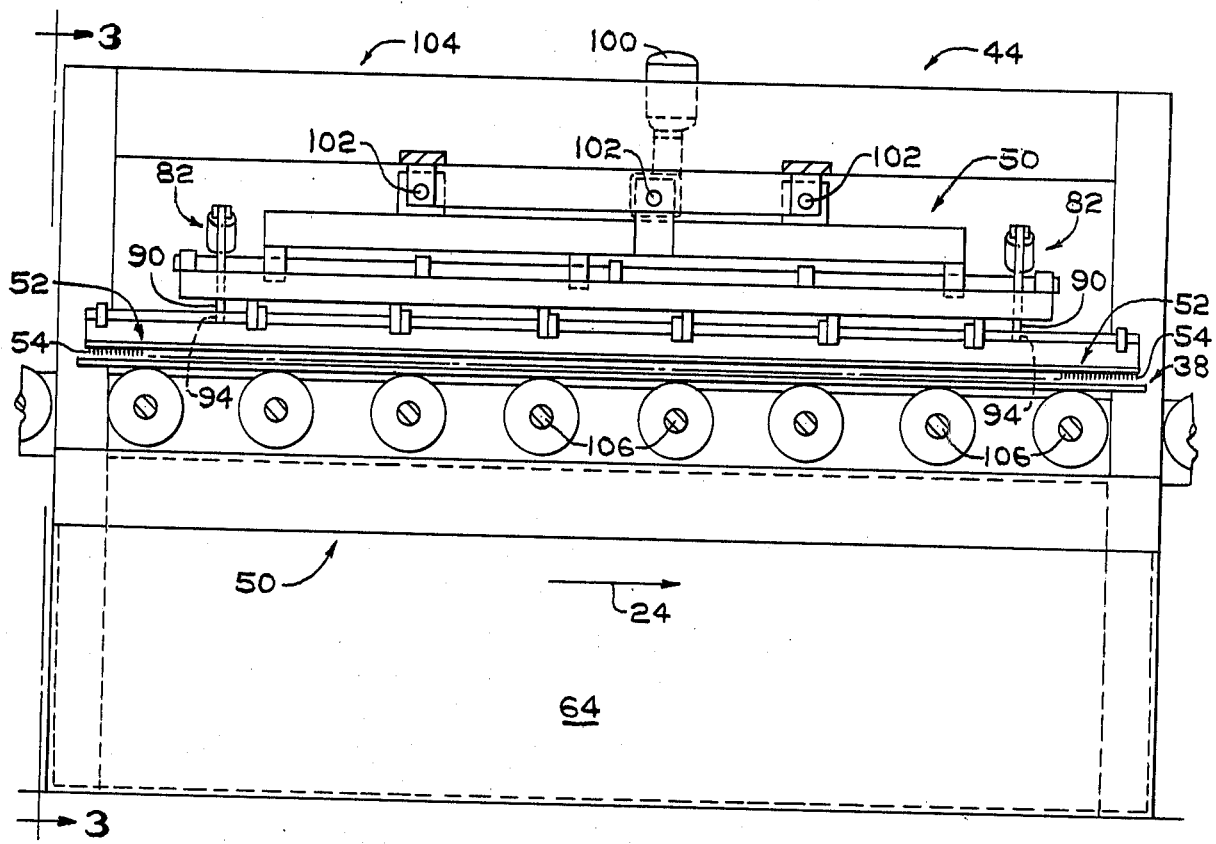
FIG. 2 is a view taken along lines 2—2 of FIG. 1.

Shown in FIGS. 1a and 1b is a conveyor 20 for advancing a glass ribbon 22 along a movement path in the direction of the arrow 24 past a first edge scoring device 26 to impose a score 28 e.g. innermost score spaced from adjacent ribbon edge or bulb edge 30; under lateral scoring or cross scoring equipment 32 to impose lateral or cross score 34 in the ribbon 22; past lateral score opening station 36 for opening the lateral score 34 to sever the ribbon 22 into lehr ends 38; past a second edge scoring device 40 to impose a second score e.g. outermost score 42 between the score 28 and ribbon edge 30; and into bulb edge removal station 44 to remove the bulb edges of the lehr end 38 to provide an uncut section 46. The uncut section 46 advances along the movement path into a position where it is further processed, e.g. stored and/or cut into smaller sheets (not shown).

The conveyor 20, scoring devices 26 and 40, cross-scoring equipment 32 and lateral score opening station 36 are not limiting to the invention and are discussed to illustrate one environment in which the invention may be practiced. The first and second edge scoring devices 26 and 40 and cross-scoring equipment 32 may be any of the types known or used in the art for imposing a score in the ribbon. Scoring techniques and apparatus that may be used in the practice of the invention but not limiting thereto are taught in U.S. Pat. Nos. 3,244,337; 3,800,991; 3,865,293; 3,865,294; and 4,057,184 which teachings are hereby incorporated by reference. The lateral score opening station 36 is of the type including a lift roll 48 to raise and sever the ribbon at the lateral score 34. Thereafter the roll 48 is lowered as the downstream conveyor rolls 49 are accelerated to separate the trailing edge of the lehr end 38 and leading edge of the ribbon 22 to prevent edge damage. A lateral or cross score opening station that may be used in the practice of the invention is taught in U.S. Pat. No 3,142,427 which teachings are hereby incorporated by reference.

Figure 3:
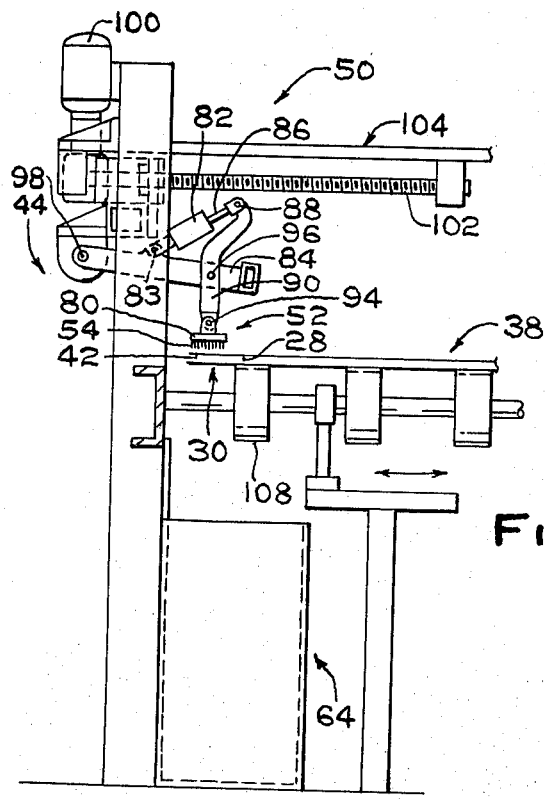
FIG. 3 is a view taken along lines 3—3 of FIG. 2.
Figure 4:
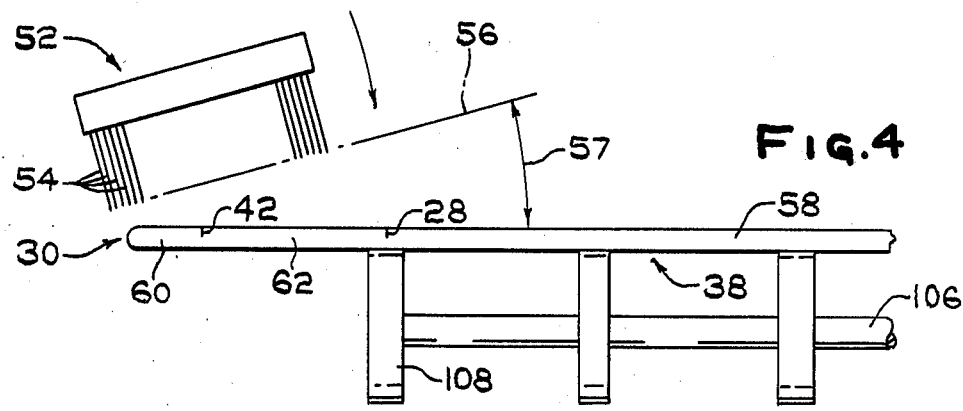
FIG. 4 illustrates relative position of a severing device of the instant invention to bulb edge of a lehr end prior to the application of a bending moment about outermost score in accordance to the teachings of the invention.
Figure 5:
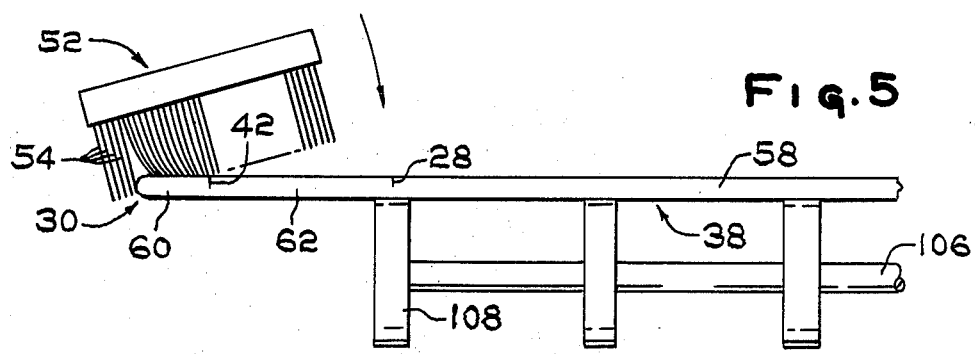
FIG. 5 illustrates relative position of the severing device to the bulb edge during the application of bending moment about the outermost score in the lehr end.
Figure 6:
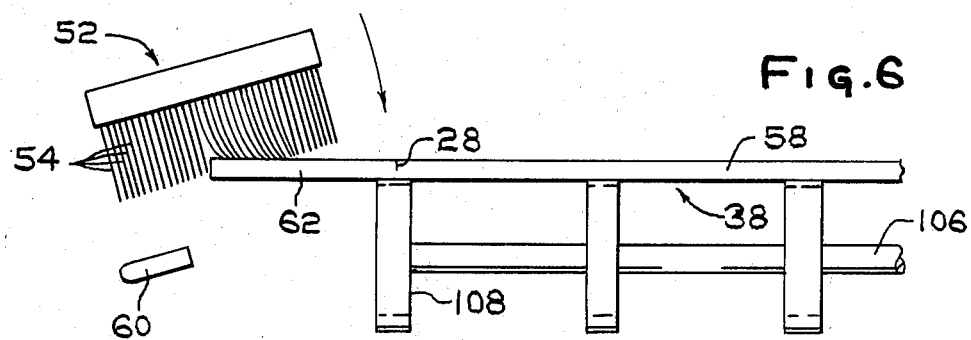
FIG. 6 illustrates relative position of the severing device and the bulb edge during application of bending moment about innermost score in the lehr end and severing of the bulb edge at the outermost score.
Figure 7:
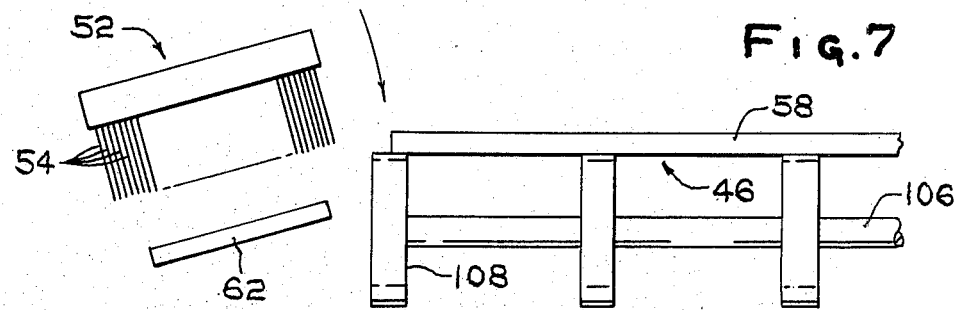
FIG. 7 illustrates the relative position of the severing device and bulb edge during severing of the bulb edge at the innermost score.

The bulb edge removal station 44 incorporating features of the invention has an edge snapper 50 mounted on each side of the conveyor 20 for removing the bulb edge 30 from the lehr end 38. With reference to FIGS. 2 and 3, the edge snappers 50 each include a sheet engaging member 52 which in the preferred embodiment of the invention has a plurality of flexible fingers 54 shown better in FIGS. 4–7. The fingers 54 lie in a plane designated by numeral 56 (shown only in FIG. 4) subtending an oblique angle 57 with major surface 58 of the lehr end 38 or plane of the movement path 24. Angling the fingers 54 relative to the sheet surface 58 of the lehr end 38 sequentially opens the scores 42 and 28. For example, as the engaging member 50 moves toward the lehr end surface 58, a portion of the flexible fingers 54 engage edge section 60 between the edge 30 and the second score 42 (FIG. 5). Continual downward motion of the engaging member 52 applies to a bending moment force to sever the edge section 60 at the second or outermost score line 42 as a downward force is applied to edge section 62 by an adjacent or contiguous portion of the flexible fingers 54 (FIG. 6). The engaging member is moved further downward to sever the edge section 62 along the first or innermost score 28 (FIG. 7). The severed edge portions 60 and 62 drop into a cullet chute 64 (see FIG. 3).

The diameter, length and spacing of the flexible fingers 54 are selected to apply a bending moment force of sufficient magnitude to sever the edge sections 60 and 62 along the scores 42 and 28 respectively while if desired allowing relative unrestricted movement of the lehr end 38 along the movement path 24. Increasing the diameter of the flexible fingers 54 for a given length and spacing increases the applied bending moment force and friction acting against the movement of the lehr end 38 along the movement path 24. Decreasing the diameter of the fingers 54 for a given length and spacing decreases the applied bending moment force and friction acting against the movement of the lehr end. Increasing the length of the fingers 54 for a given diameter and spacing decreases the applied bending moment force and friction acting against movement of the lehr end. Decreasing the length of the fingers 54 for a given diameter and spacing increases the applied bending moment force and friction acting against movement of the lehr end. Decreasing the spacing of the fingers 54 for a given length and diameter increases the applied bending moment force and friction acting against movement of the lehr end. Increasing the spacing of the fingers 54 for a given length and diameter decreases the applied force and friction acting against movement of the lehr end. In the practice of the invention, the bulb edge 30 may be severed from a moving or stationary lehr end 38.

When two or more scores, e.g. scores 28 and 42 are employed for removing the bulb edge, the depth of the scores decrease as the distance from the bulb edge increases, e.g. score 42 is deeper than score 28. In this manner less force is required to sever a bulb edge section at the outermost score than at the adjacent score to prevent simultaneous opening or more than one score. Although the discussion has been directed to employing two scores for removing bulb edges from lehr ends, the invention is not limited thereto. Preferably two scores are imposed in the bulb edges for subsequent removal from the lehr end when the lehr end has a thickness above about 5/32 inch (0.40 centimeter). This is because the stresses in the bulb edge necessitate sequential removal of at least two edge sections to provide a smooth cut edge. For lehr ends having a thickness of below about 5/32 inch (0.40 centimeter) one score in a bulb edge is accepted to provide a smooth cut edge.

Figure 8:
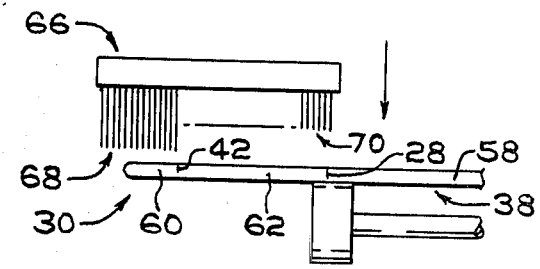
FIG. 8 illustrates an alternate embodiment of a severing device of the instant invention.

With reference to FIG. 8 there is shown another type of engaging member designated by the numeral 66 incorporating features for severing bulb edge sections form a lehr end. The engaging member 66 has a first plurality of fingers or finger portion 68 and a second plurality of fingers or finger portion 70 similar to flexible fingers 54 shown in FIGS. 4–7 except that the surface of the first portion 68 is lower than the surface of the second portion 70 as shown in FIG. 8. The lower portion 68 applies a bending moment force to the edge portion 60 to sever same along the score 42 and the upper portion 70 applies a bending moment force to the edge section 62 to sever same along the score 28. The plane of the portions 68 and 70 (1) may be parallel to one another and to the surface 58 of the lehr end 38; (2) may be at an oblique angle to one another and to the surface 58 of the lehr end 38 or (3) combinations of (1) and (2).

Figure 9:
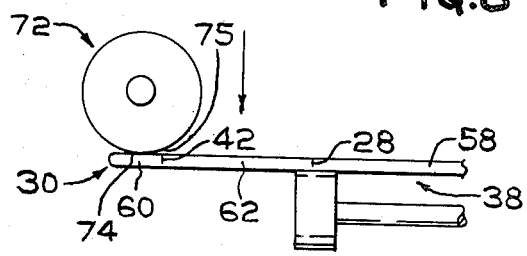
FIG. 9 illustrates an additional embodiment of a severing device of the instant invention.
Figure 10:
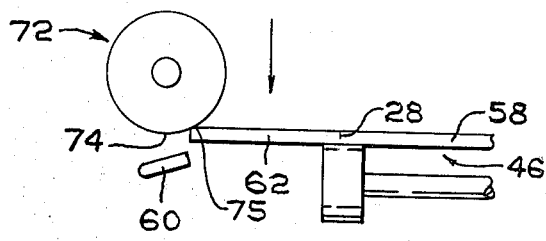
FIG. 10 illustrates relative position of the severing device shown in FIG. 9 and the lehr end during severing of the bulb edge at the outermost score.

With reference to FIGS. 9 and 10 there is shown still another type of a sheet engaging member designated by the numeral 72. The engaging member 72 is a cylinder preferably having a resilient surface. The engaging member 72 is moved downward as viewed in FIG. 9 to urge arcuate surface portion 74 against edge section 60 to sever same at the score 42 (see FIG. 10). Continual downward motion of the engaging member 72 biases arcuate section 75 against edge section 62 to sever same at score 28.

Although the invention was discussed for severing bulb edges from lehr ends it can be appreciated that the invention may be practiced on any sheet of refractory material to sever portions therefrom. Further the refractory material may be glass-ceramics and/or ceramics. The invention is not limiting to the apparatus employed for moving the engaging member 52, 66 or 72 toward the lehr end to sever the bulb edge and any convenient mechanical arrangement may be used.

DETAILED DESCRIPTION OF THE INVENTION

A glass ribbon 22 having a thickness of about 0.25 inch (6 millimeters) is advanced by conveyor 20 under scoring device 26 which imposes a score 28 about 0.012 inch (0.3 millimeters) deep on each side of the ribbon spaced about 5½ inches (14 centimeters) from the ribbon edge 30. The scores 28 are imposed by a scoring wheel (not shown) having a diameter of about 7/32 inch (0.55 centimeter) and a scoring angle of about 148° biased against the ribbon surface 58 under a load of about 12 pounds (5.4 kilograms). The glass ribbon further advances through cross-scoring equipment 32 which imposes lateral scores 34 in the ribbon at spacings of about 160 inches (3.9 meters) and thereafter into lateral score opening station 34. In the score opening station 36, lift roll 48 raises the ribbon 30 relative to the lateral score 34 to sever lehr ends 38 from the glass ribbon. As the lift roll 48 moves downward the lehr end 39 is momentarily accelerated roll 49 to separate the trailing edge of the lehr end 38 from the now leading edge of the glass ribbon 22. The lehr end 38 moves through second scoring station 40 where a second score 42 having a depth of about 0.20 inches (4.8 millimeters) in the lehr end spaced about 3 inches (7.62 centimeters) from the adjacent ribbon edge. The second scores 42 are imposed by a scoring wheel having a diameter of about ⅜ inch (0.95 centimeters) a scoring angle of about 158° biased against the lehr end under a load of about 55 pounds (25 kilograms). The scored lehr end 38 advances into bulb edge removal station 44 incorporating features of the invention.

The bulb edge removal station 44 shown in FIG. 1 has a bulb edge snapper 50 mounted on each side of the conveyor 20. With reference to FIGS. 2 and 3 a plurality of scrub brushes 52 having a width of about 3 inches (7.62 centimeters) and a length of about 6 inches (15.24 centimeters) are secured in any convenient manner on rigid member 80 having a length of about 170 inches (42.50 meters). Cylinder assemblies 82 are each pivotably mounted at 83 to rigid strut 84 with piston 86 pivotally mounted at 88 to arm 90. The arm 90 is pivotally mounted at 96 to the strut 84 and at 94 to the member 80. The strut 84 is mounted at 98 for adjusting the strut 84 such that the brush surface or plane 56 of the brush is spaced about ½ inch (1.27 centimeters) from lehr surface 58. The rigid member 80 is adjusted at 94 to set the plane of the brush at an angle of about 15° to the lehr surface 58. The brushes are conveniently positioned above the bulb edge 30 by way of motor 100 and threaded shafts 102 mounted on superstructure 104. Split conveyor rolls 106 are positioned in any convenient manner with the outermost donut roll 108 generally aligned with the innermost score 28 shown better in FIGS. 4–6.

With the lehr end 58 in the bulb edge removal station, the assembly 82 is actuated in any convenient manner to move the piston 86 out of the cylinder to move the brushes 54 toward the bulb edge 30. With reference to FIGS. 4–7, as the brush 52 moves downward the first portion of the brush fingers 54 engage edge portion 60 between the edge 30 and second score 42 to apply a bending moment about the second score 42 (FIG. 5). Continued downward motion of the brush 52 severs the edge portion 60 at the score 42 and moves a second brush section against edge portion 62 (FIG. 6). Further downward motion of the brush 52 severs portion 62 along the score 28 (FIG. 5). The severed edge portions 58 and 60 fall into the cullet chute (see FIG. 3). After the bulb edges 30 are removed, the pistons 86 are retracted to move the brushes 52 away from the uncut section 46. The split rolls 106 of the conveyor 20 are conveniently energized to move the uncut section 86 along the sheet movement path 24 for subsequent handling.

As can now be appreciated, the invention is not limited to the above example which was presented for illustration purposes only.

What is claimed is:

1. A method of severing a glass ribbon comprising the steps of:

imposing a pair of scores in the glass ribbon adjacent each edge with the score closest to the ribbon edge deeper than the remaining score;

biasing a first portion of severing means having a resilient surface and first section the ribbon toward one another to apply a biasing force against the first section to open the deeper score to sever the first section from the ribbon; followed by biasing adjacent portion of the severing member and second section of the ribbon toward one another to open the remaining score to sever the second section from the ribbon.

2. The method as set forth in claim 1 wherein said biasing steps are practiced on bulb edges of a lehr end severed from the glass ribbon.

3. A method of severing a sheet of refractory material comprising the steps of:

imposing a plurality of adjacent scores in the sheet;

providing severing means in facing relationship to a sheet surface, the severing means having a first sheet engaging surface adjacent a second sheet engaging surface; and moving the severing means and sheet relative to one another in a first direction to (1) bias the first sheet engaging surface against a portion of the sheet surface to sever the sheet along one of the scores and (2) move the sheet and the first sheet engaging surface relative to one another in the first direction to move the first sheet engaging surface beyond the sheet surface to bias the second sheet engaging surface against a portion of the sheet surface to sever the sheet along another one of the scores.

4. The method as set forth in claim 3 wherein the severing means has a resilient surface.

5. The method as set forth in claim 4 wherein the sheet of refractory material is a glass ribbon and said imposing step is practiced to impose a pair of scores adjacent each edge of the ribbon.

6. The method as set forth in claim 4 or 3 wherein refractory material selected from the group consisting of glass, ceramics and glass-ceramics.

7. The method as set forth in claim 6 wherein the sheet of refractory material is a glass ribbon and said imposing step is practiced to impose a pair of scores adjacent each edge of the ribbon.

8. The method as set forth in claim 7 wherein the score closest to the ribbon edge is deeper than the adjacent score.

9. The method as set forth in claim 8 wherein said moving step is practiced on bulb edges of a lehr end severed from the glass ribbon.

* * * * *